(12) United States Patent
Zhou et al.

(10) Patent No.: US 11,127,552 B2
(45) Date of Patent: Sep. 21, 2021

(54) HYBRID SWITCH ASSEMBLY AND CIRCUIT INTERRUPTER INCLUDING THE SAME

(71) Applicant: EATON INTELLIGENT POWER LIMITED, Dublin (IE)

(72) Inventors: Xin Zhou, Wexford, PA (US); Slobodan Krstic, Brookfield, WI (US); Yanjun Feng, Chicago, IL (US); Mark A. Juds, New Berlin, WI (US); Steven Chen, Moon Township, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 257 days.

(21) Appl. No.: 16/376,481

(22) Filed: Apr. 5, 2019

(65) Prior Publication Data

US 2020/0321180 A1 Oct. 8, 2020

(51) Int. Cl.
*H02H 1/06* (2006.01)
*H01H 71/10* (2006.01)
(Continued)

(52) U.S. Cl.
CPC ...... *H01H 71/1081* (2013.01); *H01H 71/123* (2013.01); *H02H 1/063* (2013.01); *H02H 9/00* (2013.01)

(58) Field of Classification Search
CPC .......... H02H 3/335; H02H 3/08; H02H 3/338; H02H 3/33; H02H 3/16; H02H 1/0015;
(Continued)

(56) References Cited

U.S. PATENT DOCUMENTS

| 4,618,906 A | 10/1986 | Paice et al. |
| 5,936,495 A | 8/1999 | Lecourt |

(Continued)

FOREIGN PATENT DOCUMENTS

| DE | 1186138 B | 1/1965 |
| KR | 200 439 685 Y1 | 4/2008 |

(Continued)

OTHER PUBLICATIONS

European Patent Office, "extended European search report" for corresponding EP Patent Appl. No. EP 20 16 6900, dated Aug. 4, 2020, 10 pp.

(Continued)

*Primary Examiner* — Bryan R Perez
(74) *Attorney, Agent, or Firm* — Eckert Seamans Cherin & Mellott, LLC (57) ABSTRACT

A hybrid switch assembly for use in a circuit interrupter, the hybrid switch assembly including an input, an output, separable contacts electrically connected between the input and the output, a solid state switching circuit electrically connected between the input and the output and in parallel with the separable contacts, and a fuse electrically connected in series with the solid state switching circuit. The solid state switching circuit is structured to turn on and allow current to flow through it between the input and the output for a predetermined amount of time after the separable contacts separate.

11 Claims, 9 Drawing Sheets

(51) Int. Cl.
*H01H 71/12* (2006.01)
*H02H 9/00* (2006.01)

(58) Field of Classification Search
CPC .. H02H 1/063; H01H 2009/544; H01H 83/04;
H01H 71/1081; H01H 71/123; H01H
9/547; H01H 9/542; H01H 9/00; H01H
9/05; H01H 9/04; H01H 9/02
See application file for complete search history.

(56) References Cited

U.S. PATENT DOCUMENTS

| | | | |
|---|---|---|---|
| 8,416,541 B1 | 4/2013 | White | |
| 9,922,781 B2 | 3/2018 | Zhou | |
| 2008/0310062 A1 | 12/2008 | Kumfer | |
| 2010/0277846 A1 | 11/2010 | Koshin et al. | |
| 2012/0099236 A1* | 4/2012 | Cyuzawa | H02J 1/06 |
| | | | 361/101 |
| 2014/0168830 A1* | 6/2014 | Vangool | H01H 83/04 |
| | | | 361/47 |
| 2015/0222111 A1* | 8/2015 | Magnusson | H01H 33/006 |
| | | | 361/91.5 |
| 2016/0322184 A1 | 11/2016 | Schmitz et al. | |
| 2017/0092454 A1 | 3/2017 | Kozar et al. | |
| 2017/0358403 A1* | 12/2017 | Zhou | H01H 9/0271 |

FOREIGN PATENT DOCUMENTS

| | | |
|---|---|---|
| WO | 2010/108565 A1 | 9/2010 |
| WO | 2015/091096 A1 | 6/2015 |
| WO | 2015/091105 A1 | 6/2015 |

OTHER PUBLICATIONS

USPTO, Notice of Allowance and Fee(s) Due, for corresponding U.S. Appl. No. 15/849,716, 21 pp., dated Dec. 26, 2019.

* cited by examiner

HYBRID SWITCH ASSEMBLY AND CIRCUIT INTERRUPTER INCLUDING THE SAME

BACKGROUND

Field

The disclosed concept relates generally to circuit interrupters, and in particular, to hybrid circuit interrupters that commutate current during a trip and switching operations.

Background Information

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include separable contacts. The separable contacts may be operated either manually by way of an operator handle or automatically in response to a detected fault condition. Typically, such circuit interrupters include an operating mechanism, which is designed to rapidly open the separable contacts, and a trip mechanism, such as a trip unit, which senses a number of fault conditions to trip the separable contacts open automatically. Upon sensing a fault condition, the trip unit trips the operating mechanism to a trip state, which moves the separable contacts to their open position.

When the separable contacts open during a trip, an arc will often form between the separable contacts. Arcing can be detrimental to the circuit interrupter itself and electrical components connected to it. Many techniques have been developed to minimize and extinguish arcing as quickly as possible. However, arcing cannot be completely avoided. Nevertheless, it is beneficial to minimize the effects of arcing during a trip or switching operations. In higher DC voltage applications, it is also a challenge to generate and maintain an arc voltage higher than the source voltage in order to interrupt the DC circuit.

There is room for improvement in circuit interrupters.

SUMMARY

These needs and others are met by embodiments of the disclosed concept in which a hybrid switch assembly for use with a circuit interrupter includes a solid state switching circuit that commutates current past separable contacts when the separable contacts are separated.

In accordance with one aspect of the disclosed concept, a hybrid switch assembly for use in a circuit interrupter comprises: an input; an output; separable contacts electrically connected between the input and the output; a solid state switching circuit electrically connected between the input and the output and in parallel with the separable contacts; and a fuse electrically connected in series with the solid state switching circuit, wherein the solid state switching circuit is structured to turn on and allow current to flow through it between the input and the output for a predetermined amount of time after the separable contacts separate.

In accordance with another aspect of the disclosed concept, a circuit interrupter comprises: a line side structured to electrically connect to a power source; a load side structured to electrically connect to a load; a hybrid switch assembly electrically connected between the line side and the load side, the hybrid switch assembly including: an input electrically coupled to the line side; an output electrically coupled to the load side; separable contacts electrically connected between the input and the output; a solid state switching circuit electrically connected between the input and the output and in parallel with the separable contacts; and a fuse electrically connected in series with the solid state switching circuit, wherein the solid state switching circuit is structured to turn on and allow current to flow through it between the input and the output for a predetermined amount of time after the separable contacts separate; an operating mechanism structured to open the separable contacts; and an electronic trip unit structured to detect a fault in power flowing through the circuit interrupter and cause the operating mechanism to open the separable contacts in response to detecting the fault.

In accordance with another aspect of the disclosed concept, a hybrid switch assembly for use in a circuit interrupter comprises: an input; an output; separable contacts electrically connected between the input and the output; a moveable arm structured to move to separate the separable contacts; a trigger switch disposed in a path of the moveable arm and structured to be actuated when the moveable arm moves to separate the separable contacts; and a solid state switching circuit electrically connected between the input and the output and in parallel with the separable contacts, wherein the solid state switching circuit is structured to turn on for a predetermined amount of time after the separable contacts separate, and wherein the solid state switching circuit includes a trigger circuit structured to delay the solid state switching circuit from turning on a predetermined amount of time after the trigger switch is actuated.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 1:
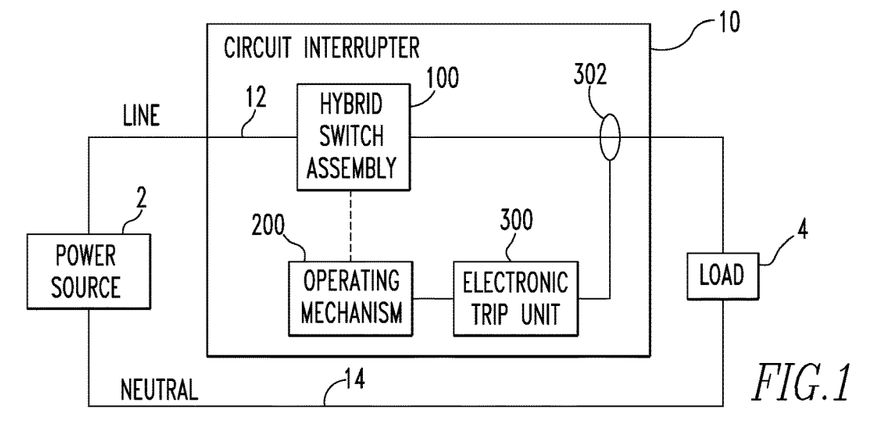
FIG. 1 is a schematic diagram of a circuit interrupter in accordance with an example embodiment of the disclosed concept.

FIG. 1 is a schematic diagram of a circuit interrupter 10 (e.g., without limitation, a circuit breaker) in accordance with an example embodiment of the disclosed concept. The circuit interrupter 10 is structured to be electrically connected between a power source 2 and a load 4 via LINE and NEUTRAL conductors 12,14. The circuit interrupter 10 is structured to trip open or switch open to interrupt current flowing between the power source 2 and load 4 in the case of a fault condition (e.g., without limitation, an overcurrent condition) to protect the load 4, circuitry associated with the load 4, as well as the power source 2

The circuit interrupter 10 includes a hybrid switch assembly 100, an operating mechanism 200, and an electronic trip unit 300. The electronic trip unit 300 is structured to monitor power flowing through the circuit interrupter 10 via a current sensor 302 and/or other sensors and to detect fault conditions based on the power flowing through the circuit interrupter 10. In response to detecting a fault condition, the electronic trip unit 300 is structured to output a signal to initiate a trip. The operating mechanism 200 is structured to cause the hybrid switch assembly 100 to open to interrupt current flowing through the circuit interrupter 10 in response to the signal from the electronic trip unit 300. For example and without limitation, the operating mechanism 200 is structured to cause separable contacts 102 (shown in FIGS. 2-4) to open by, for example and without limitation, moving a movable arm to cause the separable contacts 102 to separate.

Figure 2:
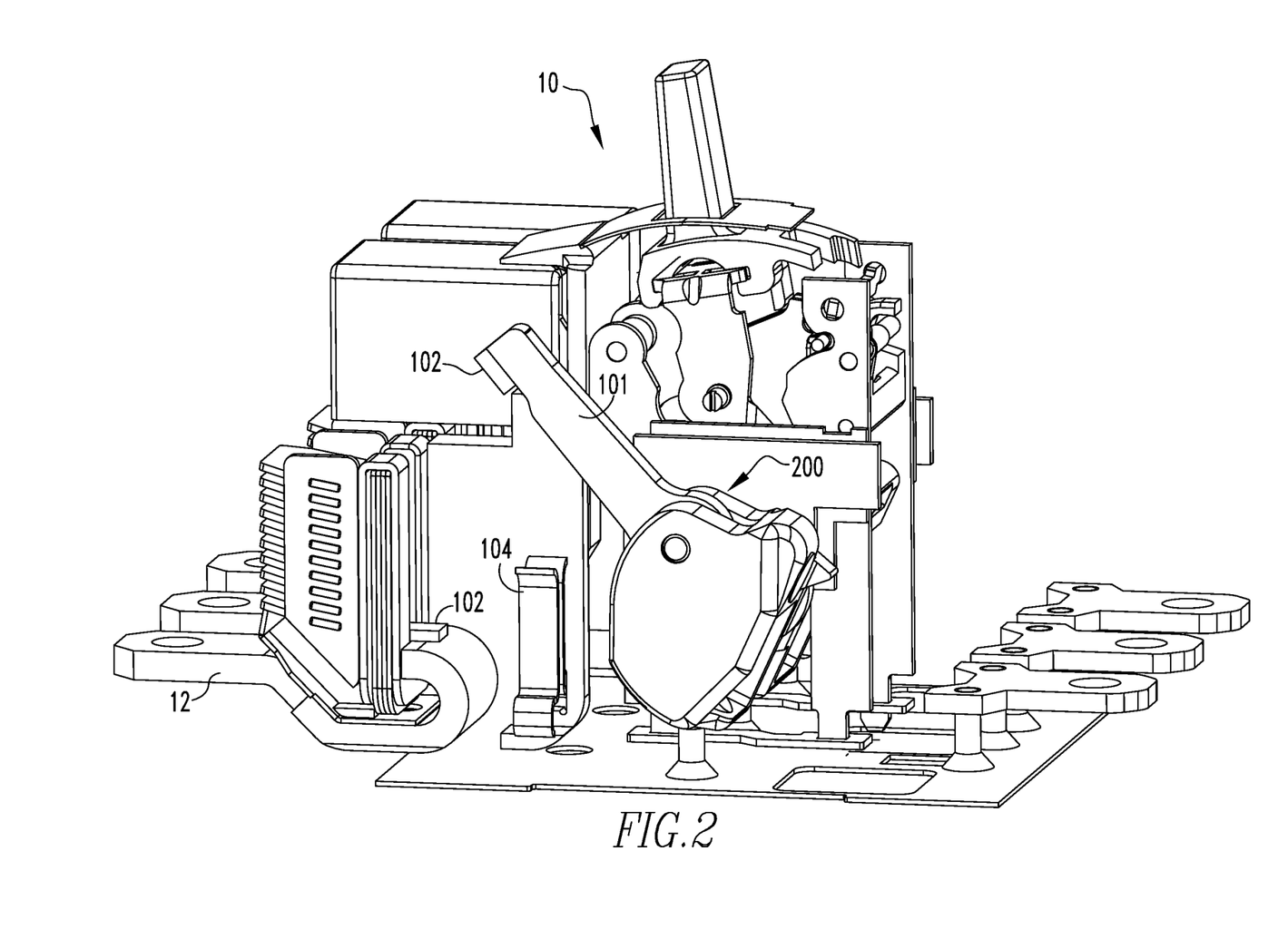
FIG. 2 is a diagram of a circuit interrupter in accordance with an example embodiment of the disclosed concept.
Figure 3:
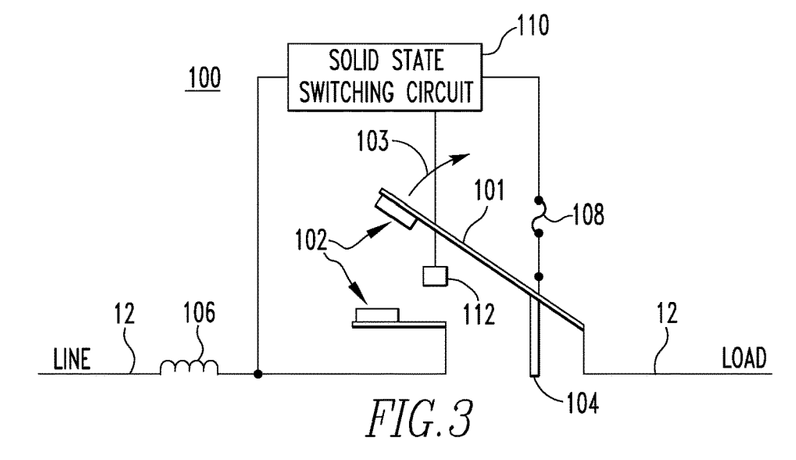
FIG. 3 is a schematic diagram of a hybrid switch assembly in accordance with an example embodiment of the disclosed concept.

The hybrid switch assembly 100 includes separable contacts 102 (shown in FIGS. 2-4) and a solid state switching circuit 110 (shown in FIG. 3). The separable contacts 102 are structured to physically separate when a trip or switch action is initiated. The solid state switching circuit 110 includes solid state switching elements (e.g., without limitation, insulated-gate bipolar transistors (IGBTs)) that are structured to turn-on and turn-off (i.e., open and close) to allow current to selectively commutate past the separable contacts 102 while they are separated. For example, the solid state switching circuit 110 is structured to allow current to commutate past the separable contacts 102 for a limited amount of time after the separable contacts 102 are separated, in the case of a trip or switching action, or for a limited amount of time before the separable contacts 102 are closed, in the case of closing the separable contacts 102. Commutating current past the separable contacts 102 reduces the arcing and its detrimental effects. It allows the solid state switching circuit 110 to interrupter a DC circuit. Example embodiments of the hybrid switch assembly 100 will be described in more detail hereinafter.

FIG. 2 is a diagram of the circuit interrupter 100 in accordance with an example embodiment of the disclosed concept. As shown in FIG. 2, a moveable arm 101 that is attached to one of the separable contacts 102. Moving the moveable arm 101 causes the separable contacts 102 to open or close. Also shown in FIG. 2 is a clinch joint 104 which is used in the hybrid switch assembly 100 and will be described in more detail with respect to FIG. 3.

FIG. 3 is a schematic diagram of the hybrid switch assembly 100 in accordance with an example embodiment of the disclosed concept. The hybrid switch assembly 100 includes the separable contacts 102, the clinch joint 104, a current limiting inductor 106, a fuse 108, the solid state switching circuit 110, and a trigger switch 112.

When the separable contacts 102 are closed, current flows through the LINE conductor 12, the separable contacts 102, the movable arm 101 to the load 4. When the separable contacts 102 are closed, the solid state switching circuit 110 is turned off a current is unable to flow through it. When the separable contacts 102 begin to open, the movable arm 101 interacts with the trigger switch 112, which causes the solid state switching circuit 110 to turn on. When the solid state switching circuit 110 turns on, current is able to flow through it. In this state, current flows through the LINE conductor 12, the solid state switching circuit 110, and the moveable arm 101 at the point where it contacts the clinch joint 104. In this manner, current is able to commutate past the separable contacts 102. As the moveable arm 101 continues to move upward and further separate the separable contacts 102, in the direction shown by arrow 103, the moveable arm 101 separates from the clinch joint 104 (as shown for example in FIG. 2). When the moveable arm 101 separates from the clinch joint 104, the LINE connection between the power source 2 and the load 4 is broken and current cannot flow between the power source 2 and the load 4. In the progression of moving the moveable arm 101 to separate the separable contacts 102, the separable contacts 102 are opened, then current is allowed to commutate past the separable contacts 102 via the solid state switching circuit 110 for a limited time, and then the isolation is achieved when the moveable arm 101 loses contact with the clinch joint 104. This progression is able to reduce the effects of arcing.

The clinch joint 104 is a conductive member that is structured to contact the moveable arm 101 while the moveable arm 101 is disposed between prongs of the clinch joint 104. The clinch joint 104 is electrically connected to an output of the solid state switching circuit 110 such that when the moveable arm 101 contacts the clinch joint 104, there is an electrical path past the separable contacts 102 via the solid state switching circuit 110. When the moveable arm 101 loses contact with the clinch joint 104, that electrical path is broken.

The current limiting inductor 106 is electrically connected 106 in series with the LINE conductor 12. In some example embodiments of the disclosed concept, the current limiting inductor 106 is electrically connected on the LINE side of the separable contacts 102 and the solid state switching circuit 110. The current limiting inductor 106 is structured to limit the current as well as the rate of rise of the current flowing through the circuit interrupter 10 during a short circuit fault. In some example embodiments, the current limiting inductor 106 is used in medium and high voltage applications.

In some example embodiments, the fuse 108 is electrically connected between the solid state switching circuit 110 and the clinch joint 104. However, it will be appreciated by those having ordinary skill in the art that the fuse 108 may be located elsewhere such as, for example and without limitation, between the current limiting inductor 106 and the solid state switching circuit 110. The fuse 108 is structured to provide additional circuit protection. Namely, the fuse 108 is structured to provide galvanic isolation in the case of a short circuit in the solid state switching circuit 110. That is, if components in the solid state switching circuit 110 fail and current flows through the solid state switching circuit 110 even when it is turned off, the current will become high and cause the fuse 108 to blow and provide galvanic isolation to prevent current from continuing to flow through the solid state switching circuit 110. The protection provided by the fuse 108 is beneficial because the solid state switching circuit 110 includes solid state elements that are generally not intended to have current flowing through them between the power source 2 and the load 4 under normal operating conditions. Current flowing through the solid state switching circuit 110 under normal operating conditions is too high for the components and can damage the components of the solid state switching circuit 110 and create heat that can potentially cause a fire or other damage to the circuit interrupter 10. The components of the solid state switching circuit 110 are only intended to have high current flowing through them during the limited time between when the moveable arm 101 interacts with the trigger switch 112 and when the moveable arm 101 loses contact with the clinch joint 104. This limited amount of time will not damage the components of the solid state switching circuit 110. The fuse 108 provides protection against a failure in the solid state switching circuit 110 that causes current to flow through it longer than intended.

Figure 4:
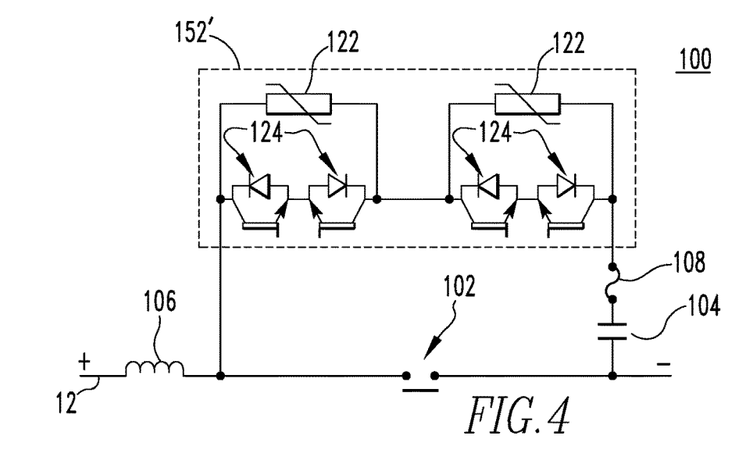
FIG. 4 is another schematic diagram of a hybrid switch assembly in accordance with an example embodiment of the disclosed concept.

FIG. 4 is another schematic diagram of the hybrid switch assembly 100 in accordance with an example embodiment of the disclosed concept. FIG. 4 shows some circuit components of a switching circuit 152' of the solid state switching circuit 110 in accordance with an example embodiment of the disclosed concept. As shown in FIG. 4, the switching circuit 152' includes two voltage dependent resistors 122 each connected in parallel with a pair of series connected IGBTs 124. The IGBTs 124 can be turned on or off under control of additional circuitry included in the solid state switching circuit 110, some examples of which will be described in more detail hereinafter. The example embodiment shown in FIG. 4 shows one example of an arrangement of solid state elements that may be included in the solid state switching circuit 110. Modules of the pair of voltage dependent resistors 122 and parallel connected IGBT 124 can be connected both in series and in parallel with each other to either increase the solid state switching circuit 110 voltage rating or current rating. However, it will be appreciated by those having ordinary skill in the art that other components in other arrangement may be employed without departing from the scope of the disclosed concept.

Figure 5:
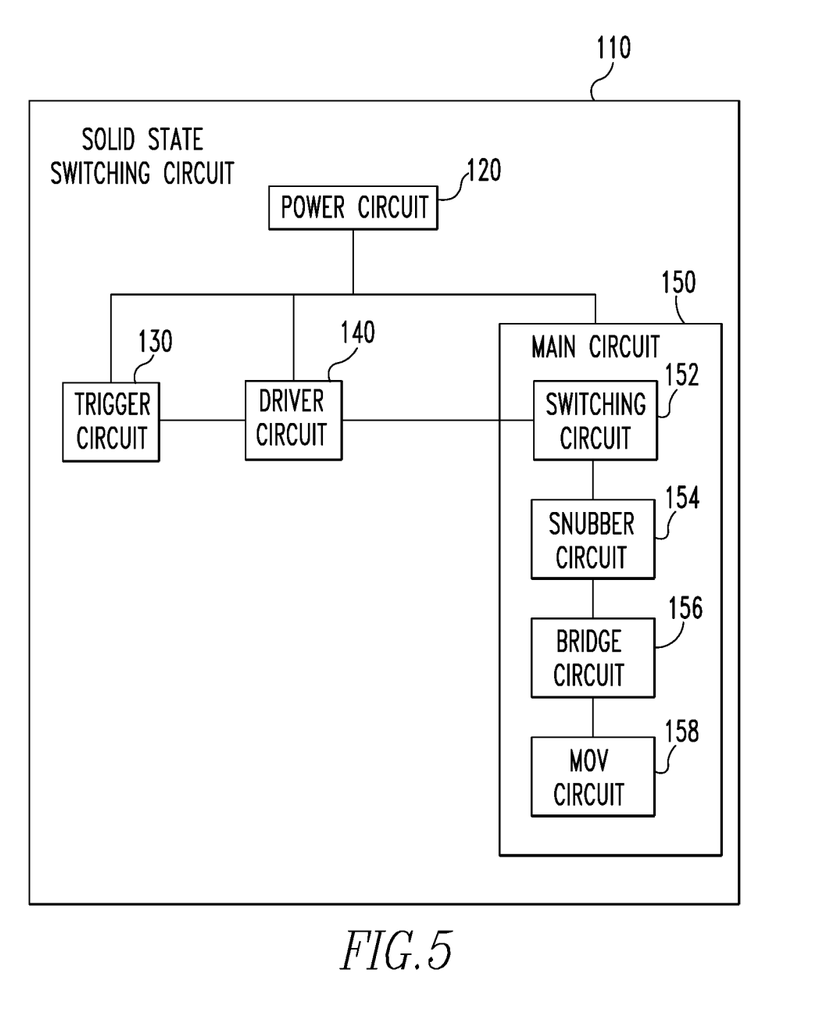
FIG. 5 is a schematic diagram of a solid state switching circuit in accordance with an example embodiment of the disclosed concept.

FIG. 5 is a schematic diagram of the solid state switching circuit 110 in accordance with an example embodiment of the disclosed concept. The solid state switching circuit 110 includes a power supply circuit 120, a trigger circuit 130, a gate driver circuit 140, and a main circuit 150.

The solid state switching circuit 110 is structured to be powered by current flowing through the circuit interrupter 10. In particular, the solid state switching circuit 110 is structured to be powered from arcing caused when the separable contacts 102 separate. The power supply circuit 120 is structured to use power from the arc to power the various components of the solid state switching circuit 110. Namely, the power supply circuit 120 is structured to convert power from the arc for use by the components of the solid state switching circuit 110. For example, the power supply circuit 120 is structured to convert power from the arc to various DC voltages suitable for use by the components of the solid state switching circuit 110.

The trigger circuit 130 is structured to receive an output of the trigger switch 112. In response to receiving the output of the trigger switch 112, the trigger circuit 130 is structured to cause the solid state switching circuit 110 to turn on (e.g., allow current to flow through it).

The gate driver circuit 140 is structured to control the solid state switching elements of the solid state switching circuit 110 to turn on and turn off upon receiving a trigger signal from the trigger circuit 130. The gate driver circuit 140 is structured to generate the control signals to control the state of the solid state switching elements.

The main circuit 150 includes a switching circuit 152, a snubber circuit 154, a bridge circuit 156, and a metal oxide varistor (MOV) circuit 158. The switching circuit 152 includes the solid state switching elements (e.g., IGBTs) that turn on to allow current to flow through the solid state switching circuit 110 or turn off the prevent current from flowing through the solid state switching circuit 110. The snubber circuit 154 is structured to absorb energy and suppress voltage spikes due to turning on or turning off the solid state switching elements. The bridge circuit 156 is structured to rectify received current to DC current. This allows the solid state switching circuit 110 to achieve bi-directional switching performance with fewer power switching components (e.g., IGBTs). Meanwhile, power from the arc will be rectified so that the current provided by the solid state switching circuit 110 to the power supply circuit 120 is DC current. The MOV circuit 158 is structured to absorb energy and clamp voltage.

In some example embodiments, the input of the main circuit 150 is electrically connected to the LINE conductor 12. The output of the main circuit 150 is electrically connected to the clinch joint 104. This configuration allows the main circuit 150 to receive power from the arc and provide the commutated current that has bypassed the separable contacts 102. The MOV circuit 158, the bridge circuit 156, the snubber circuit 154, and the switching circuit 152 are sequentially arranged from the input to the output of the main circuit 150. Some example embodiments of the power supply circuit 120, the trigger circuit 130, the gate driver circuit 140, and the main circuit 150 will be described hereinafter with reference to FIGS. 6-9.

Figure 6:
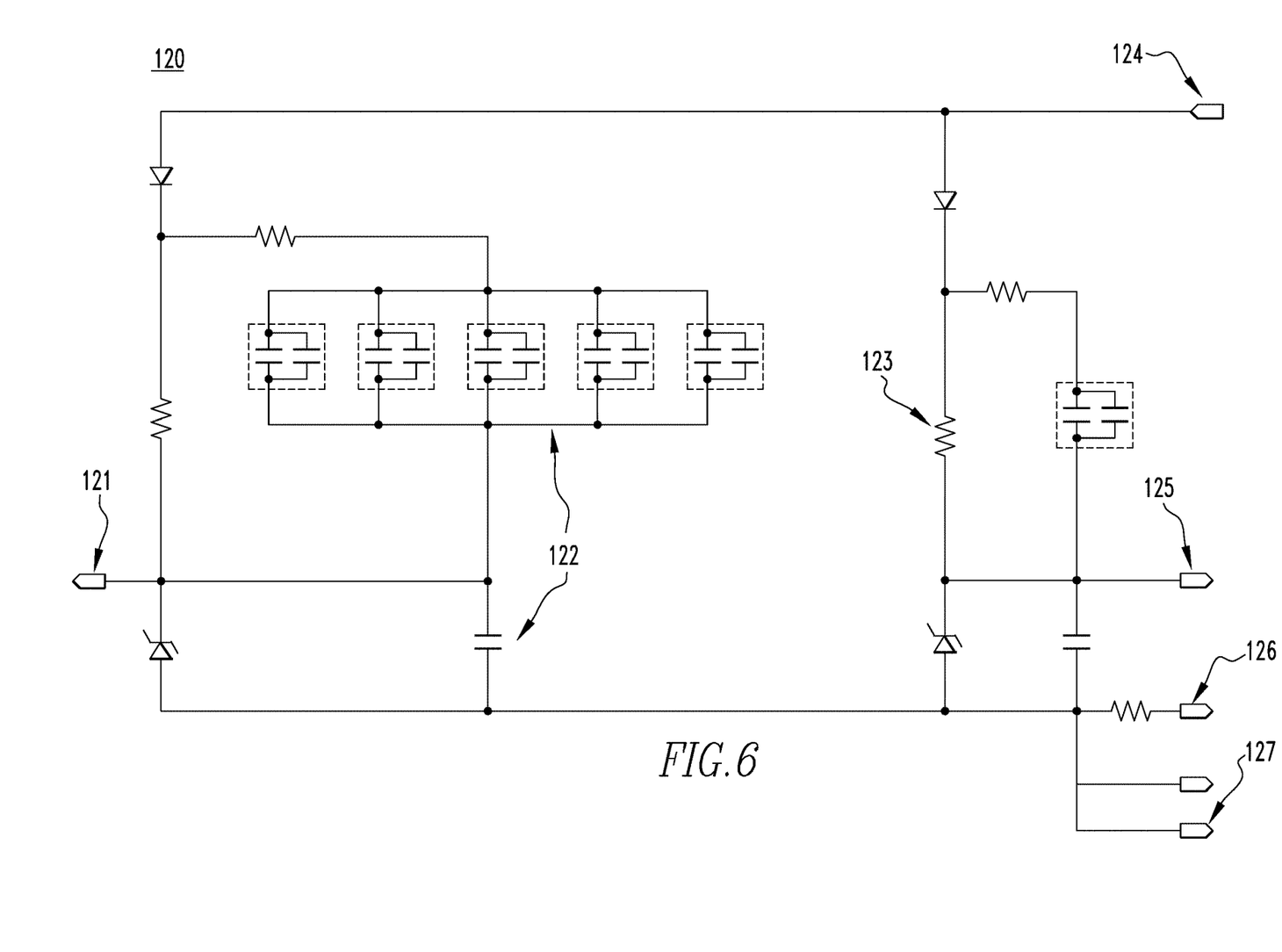
FIG. 6 is a circuit diagram of a power circuit in accordance with an example embodiment of the disclosed concept.

FIG. 6 is a circuit diagram of the power supply circuit 120 in accordance with an example embodiment of the disclosed concept. The power circuit 120 includes two inputs 124 and 126, a capacitive divider 122, a resistive divider 123, a first output 121, a second output 125, and a neutral output 127. The inputs 124 and 126 are electrically connected to the main circuit 150 outputs 163 and 164 (shown in FIG. 9) and are structured to receive power from the arc. During the arc, the voltage at the inputs 124 and 126 may be, for example, 600-900V. The resistive divider 123 reduces the output voltage. The power supply circuit 120 also include diodes arranged to clamp the output voltage. At the first output 121, the power supply circuit 120 outputs a first DC voltage (e.g., without limitation, 30V) and at the second output 125, the power supply circuit 120 outputs a second DC voltage (e.g., without limitation 6.8V). The neutral output 127 serves as a neutral reference. The power output at the first and second outputs 121,125 may be used by other components in the solid state switching circuit 110.

Figure 7A:
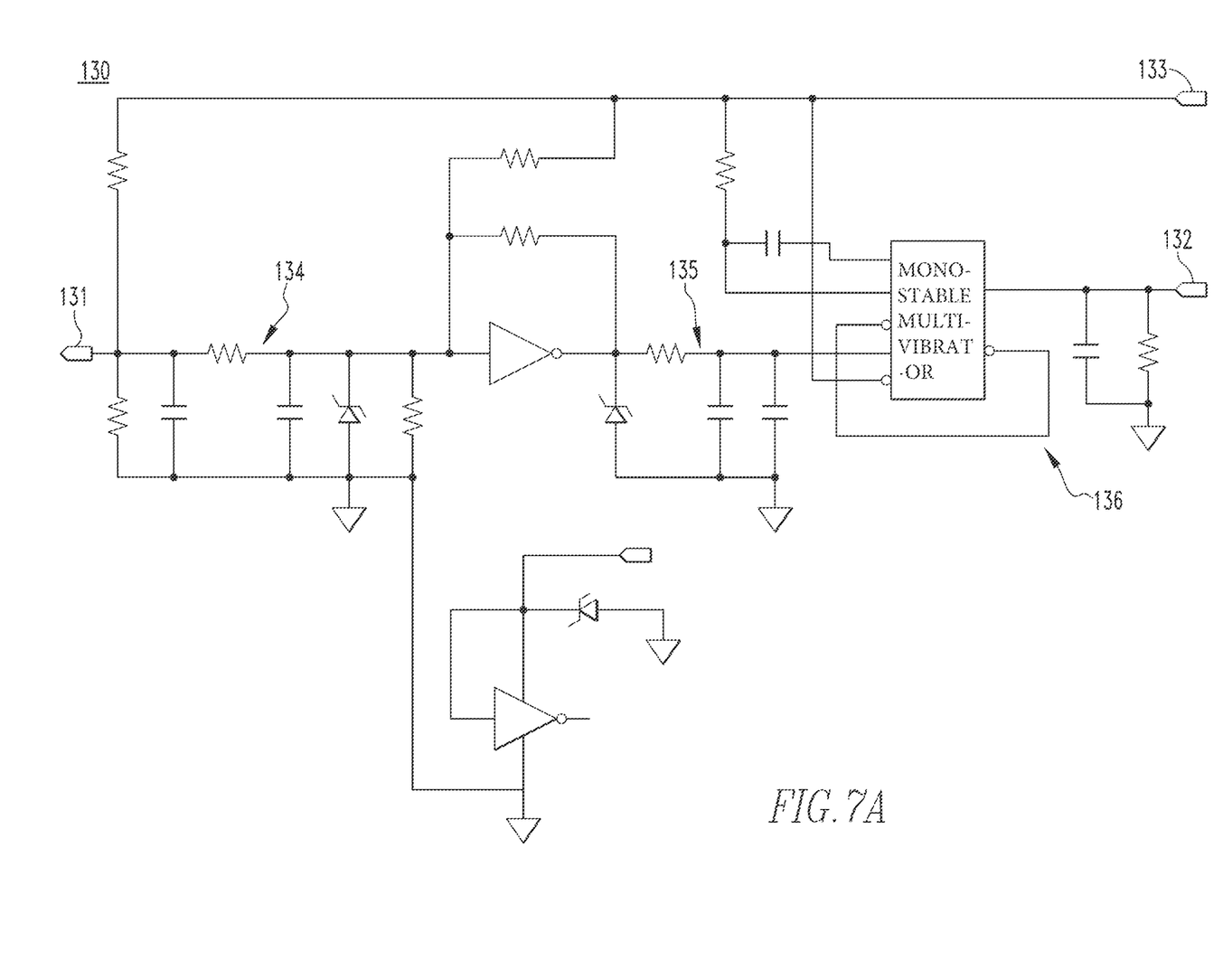
FIG. 7A is a circuit diagram of a trigger circuit in accordance with an example embodiment of the disclosed concept.

FIG. 7A is a circuit diagram of the trigger circuit 130 in accordance with an example embodiment of the disclosed concept. The trigger circuit 130 includes an input 131 that is electrically connected to the trigger switch 112 and is structured to receive the output of the trigger switch 112. The trigger circuit 130 also includes a power input 133 which is structured to receive power from the power supply circuit 120 (e.g., 6.8V) to power components of the trigger circuit 130. The trigger circuit 130 further includes an output 132 that is electrically connected to the gate driver circuit 140. The trigger circuit 130 is structured to output a signal via the output 132 to cause the gate driver circuit 140 to control the solid state switching elements in the solid state switching circuit 110 to turn on and turn off.

The trigger circuit 130 is structured to control the timing of turning on the solid state switching circuit 110 and the amount of time the solid state switching circuit 110 is turned on. In response to the trigger switch 112 being actuated by the moveable arm 101, a signal is received at the input 131 of the trigger circuit 130. In response to receiving the signal, the trigger circuit 130 does not immediately output a signal, but rather delays outputting the signal by a predetermined time. To create the predetermined delay, the trigger circuit 130 includes first and second RC circuits 134,135, which cause a predetermined delay between when the trigger circuit 130 receives a signal at its input 131 and outputs a signal at its output 132. Once the trigger circuit 130 begins outputting the signal at its output, it outputs the signal for a predetermined amount of time. To facilitate outputting the signal for the predetermined amount of time, the trigger circuit 130 includes a monostable multi-vibrator 136.

Figure 7B:
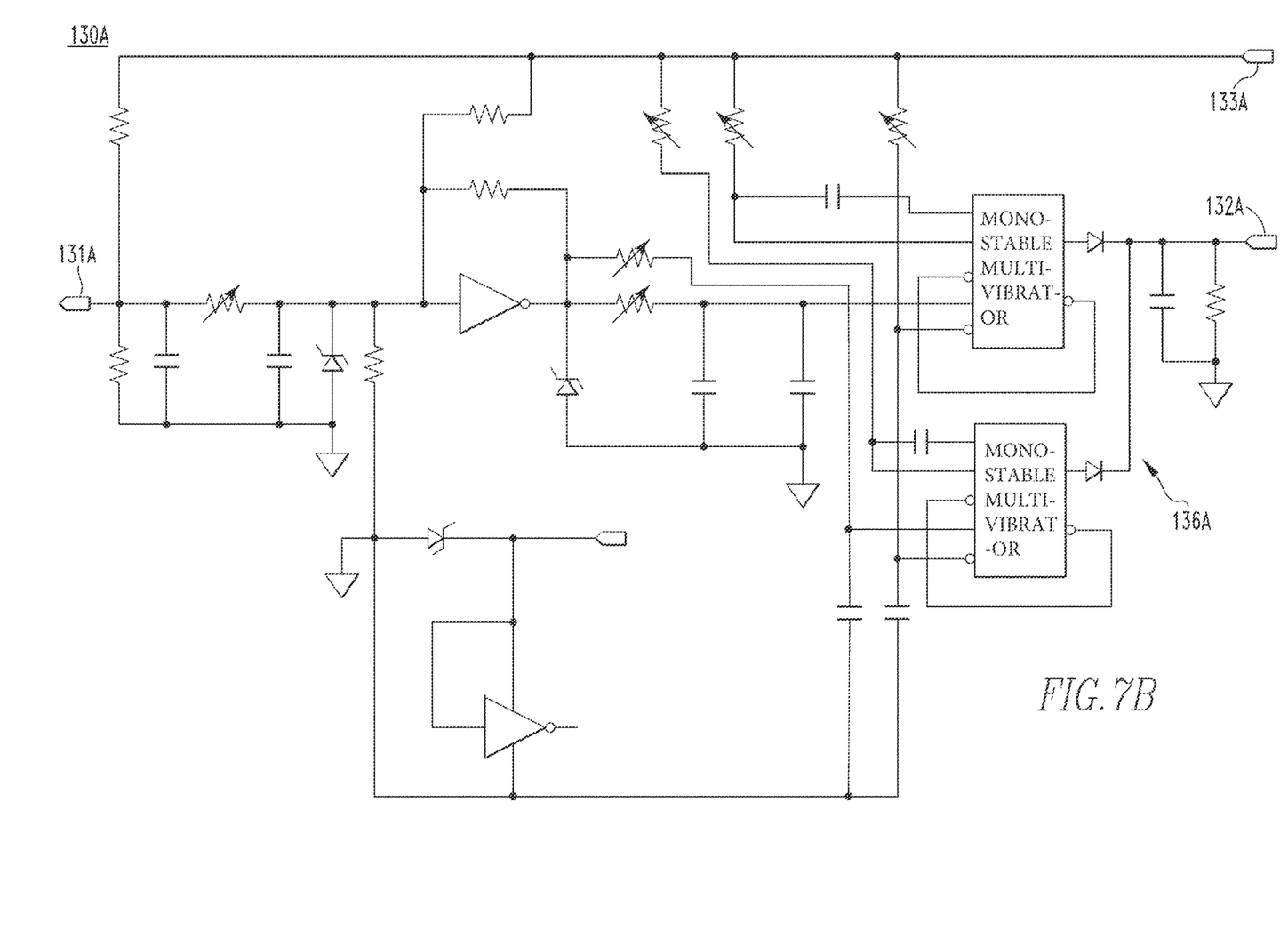
FIG. 7B is a circuit diagram of another trigger circuit in accordance with an example embodiment of the disclosed concept.

FIG. 7B is a circuit diagram of a trigger circuit 130A in accordance with another example embodiment of the disclosed concept. The trigger circuit 130A has functions of controllable double pulse, controllable delay time, and controllable predetermined solid state switching circuit 110 on time in accordance with an example embodiment of the disclosed concept. The trigger circuit 130A includes an input 131A that is electrically connected to the trigger switch 112 and is structured to receive the output of the trigger switch 112. The trigger circuit 130A also includes a power input 133A which is structured to receive power from the power supply circuit 120 (e.g., 6.8V) to power components of the trigger circuit 130A. The trigger circuit 130A further includes an output 132A that is electrically connected to the gate driver circuit 140. The trigger circuit 130A is structured to output a signal via the output 132A to cause the gate driver circuit 140 to control the solid state switching elements in the solid state switching circuit 110 to turn on and turn off.

The trigger circuit 130A is structured to control the timing of first turning-on the solid state switching circuit 110, the amount of time the solid state switching circuit stays on, and the timing of second turn-on the solid state switching circuit 110, and the amount of time the solid state switching circuit stays on. All these parameters can be adjusted by adjusting the potentiometers in the trigger circuit 130A which can generate different RC circuit combinations. In response to the trigger switch 112 being actuated by the movable arm 101, a signal is received at the input 131A of the trigger circuit 130A. In response to receiving the signal, the trigger circuit 130A does not immediately output a signal, but rather delays outputting the signal by a predetermined time. To create the predetermined delay, the trigger circuit 130A includes first and second RC circuits, which are controllable by the two potentiometers, and cause a predetermined delay between when the trigger circuit 130A receives a signal at its input 131A and outputs a signal at its output 132A. Once the trigger circuit begins outputting the signal at its output 132A, it outputs the signal for a predetermined amount of time. To facilitate outputting the signal for the predetermined amount of time, the trigger circuit 130A includes a mono-stable multi-vibrator which can be controllable for the amount of solid state switch on time. Once the trigger circuit 130A finishes outputting the first output signal, it will output a second signal for a predetermined amount of time with predetermined delay time to prevent re-ignition. To generate the second signal for the predetermined amount of time, the trigger circuit 130A includes a second mono-stable multi-vibrator which can be controllable for the amount of solid state switch on time and has a controllable input delay by another RC with potentiometer.

Figure 8:
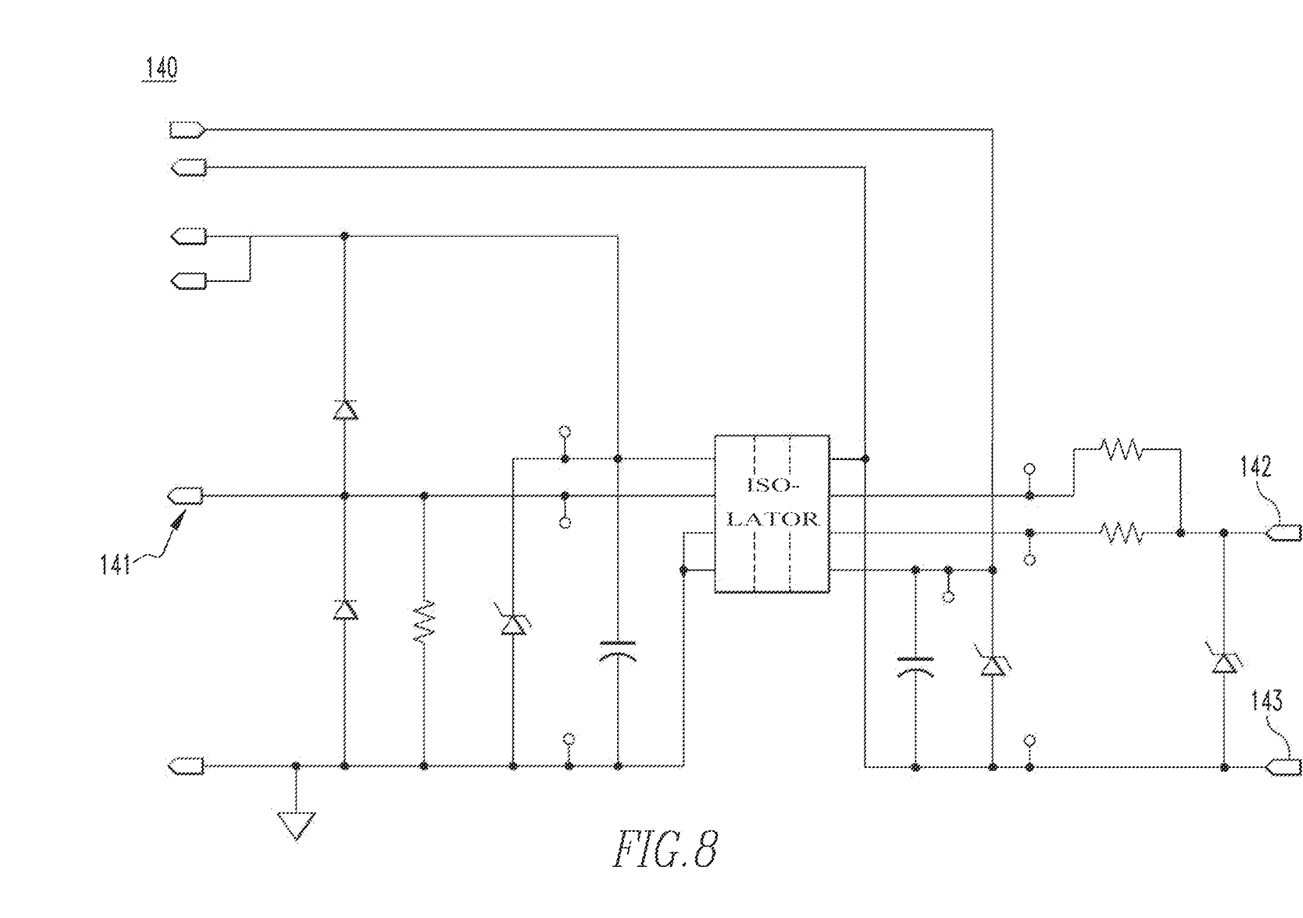
FIG. 8 is a circuit diagram of a gate driver circuit in accordance with an example embodiment of the disclosed concept.

FIG. 8 is a circuit diagram of the gate driver circuit 140 in accordance with an example embodiment of the disclosed concept. The gate driver circuit 140 includes an input 141 and an output 142. The gate driver circuit 140 also includes a neutral output 143 which is used as a reference. The gate driver circuit 140 is structured to receive the output of the trigger circuit 130 at the input 141. The gate driver circuit 140 is structured to isolate the input 141 from the output 142 and output a signal suitable for controlling solid state switching elements (e.g., IGBTs) at the output 142 based on the signal received at the input 141.

Figure 9:
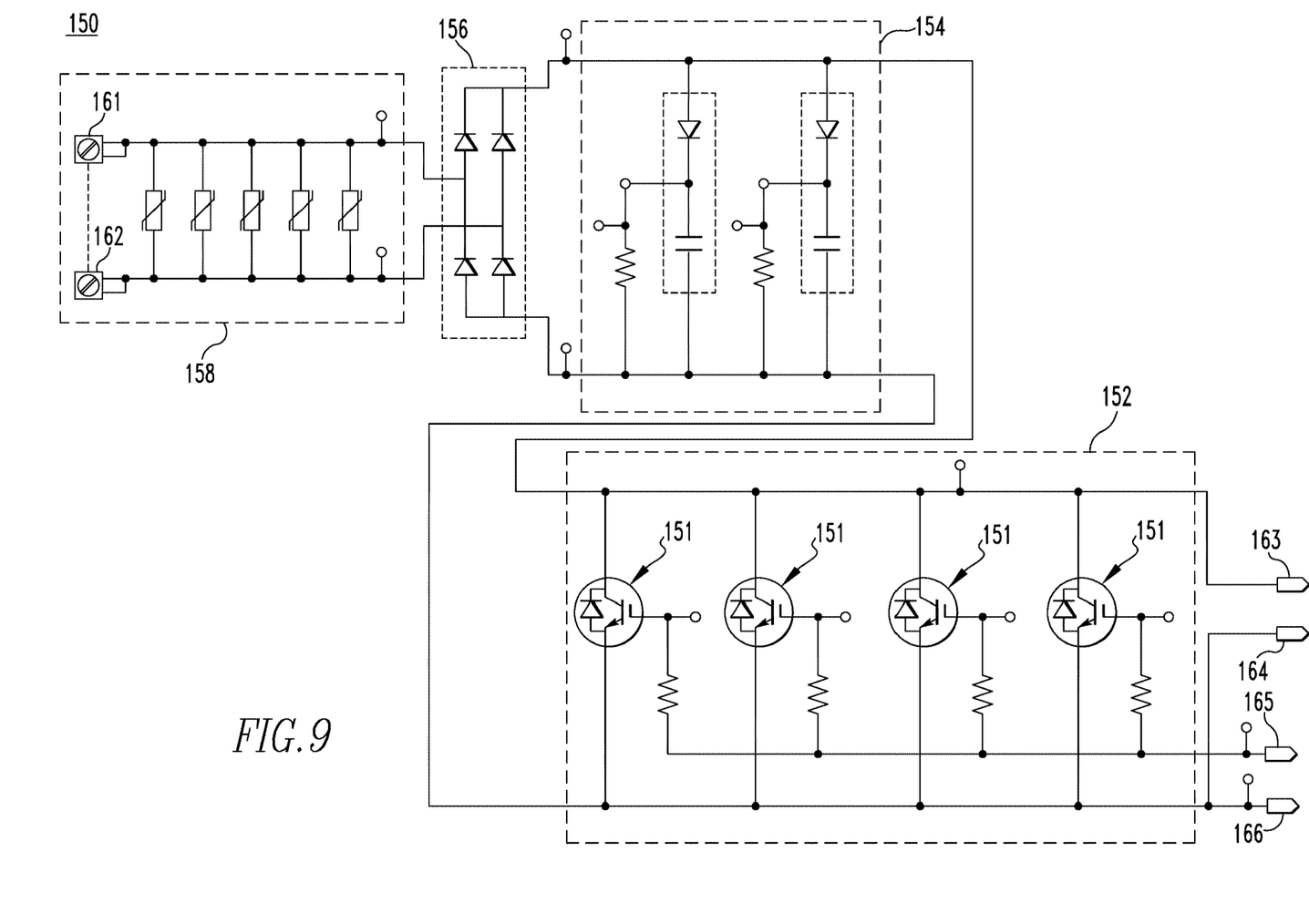
FIG. 9 is a circuit diagram of a main switching circuit in accordance with an example embodiment of the disclosed concept.

FIG. 9 is a circuit diagram of the main circuit 150 in accordance with an example embodiment of the disclosed concept. The main circuit 150 includes the switching circuit 152, the snubber circuit 154, the bridge circuit 156, and the MOV circuit 158. The main circuit 150 also includes a line side input 161, a load side output 162, and control inputs 165,166. The main circuit 150 also provides power to the power supply circuit 120 inputs 124 and 126 at outputs 163 and 164.

The main circuit 150 is structured to electrically connect to the LINE conductor 12 via inductor 106 on the line side of the circuit interrupter 10 at the line side inputs 161. The main circuit 150 is structured to electrically connect to the clinch joint 104 via fuse 108 at the load side output 162. The main circuit 150 is structured to electrically connect to the outputs of the gate driver circuit 140 at the control inputs 165,166.

The MOV circuit 158 is structured to absorb energy and clamp voltage. In the example embodiment shown in FIG. 9, the MOV circuit 158 includes a number of MOVs electrically connected between the input 161 and the output 162 of the main circuit 150. The output of the MOV circuit 158 is electrically connected to an input of the bridge circuit 156. The bridge circuit includes a number of diodes arranged in a bridge and is structured to rectify the output of the MOV circuit 158. The output of the bridge circuit 156 is electrically connected to an input of the snubber circuit 154. The snubber circuit 154 is arranged as a snubber and is structured to absorb energy and suppress voltage spikes.

The switching circuit 152 includes a number of solid state switching elements 151 such as IGBTs. The switching circuit 152 is structured to receive control signals via the control inputs 165,166. The control signals cause the solid state switching elements 151 to turn on or turn off. For example, the control signals are received at gates of the solid state switching elements 151, which causes the solid state switching elements to turn on or turn off. When the solid state switching elements 151 are turned off, the solid state switching circuit 110 is turned off and current cannot flow through it. When the solid state switching elements 151 are turned on, the solid state switching circuit 110 is turned on and current can flow through it.

Via the trigger circuit 130, the timing of turning on and off of the solid state switching circuit 110 can be precisely controlled. That is, the trigger circuit 130 creates a predetermined delay time after the trigger switch 112 is actuated before outputting a signal and outputs the signal for a predetermined amount of time. The output of the trigger circuit 130 causes the solid state switching elements 151 to selectively turn on, remain on for the predetermined amount of time, and then turn off. The result is that the solid state switching circuit 110 commutates current past the separable contacts 102 in a controlled manner and then turns off. The controlled manner of turning on and turning off of the solid state switching circuit 110 provides reliable results and limits the potential to damage of solid state switching circuit 110 or other components of the circuit interrupter 10 or the circuit it protects.

Figure 10:
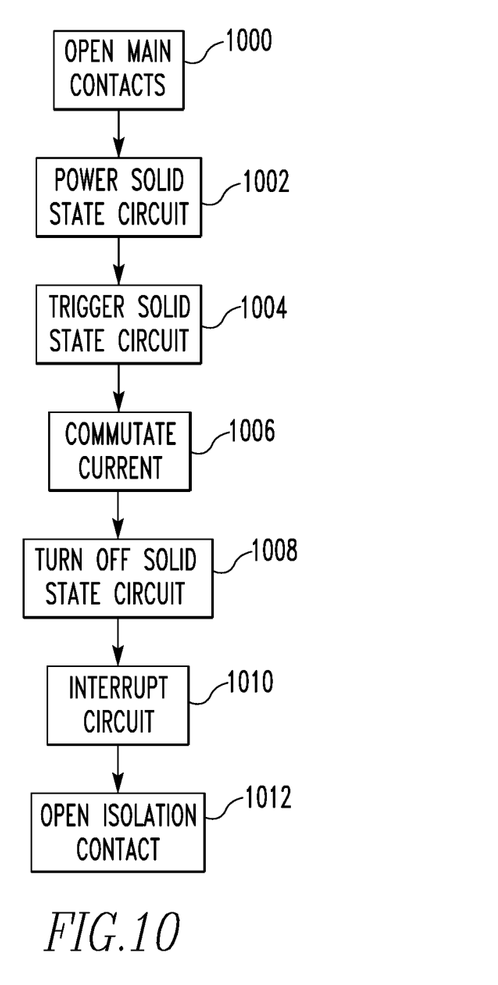
FIG. 10 is a flowchart of a method of opening contacts in accordance with an example embodiment of the disclosed concept.

FIG. 10 is a flowchart of a method of opening contacts in accordance with an example embodiment of the disclosed concept. The method of FIG. 10 may be implemented, for example in the circuit interrupter 10 described herein. The method begins at 1000 where the main separable contacts 102 of the circuit interrupter 10 are opened. At 1002, the solid state switching circuit 110 is powered. For example, the solid state switching circuit 110 receives power from the arc created by opening the separable contacts 102. At 1004, the solid state switching circuit 110 is triggered. For example, the trigger switch 112 is actuated by movement of the moveable arm 101, which results in a trigger signal being output to the solid state switching circuit 110. As a result of receiving the trigger signal, the solid state switching circuit 110 turns on and commutates current past the separable contacts 102 at 1006. As previously described, the solid state switching circuit 110 may turn on a predetermined delay time after receiving the trigger signal.

After a predetermined amount of time, the solid state switching circuit 110 turns off at 1008, which results in the circuit being interrupted at 1010. The method concludes with the line and load side of the circuit interrupter 10 becoming isolated at 1012. For example, isolation occurs when the moveable arm 101 loses contact with the clinch joint 1012. In accordance with the method of FIG. 10, current may be commutated past the separable contacts 102 in a controlled manner.

Figure 11:
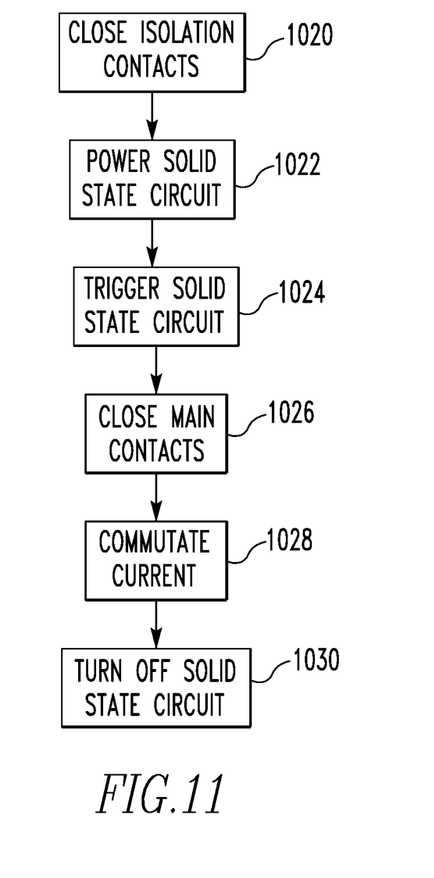
FIG. 11 is a flowchart of a method of closing contacts in accordance with an example embodiment of the disclosed concept.

FIG. 11 is a flowchart of a method of closing contacts in accordance with an example embodiment of the disclosed concept. The method of FIG. 11 may be employed when closing contacts in a circuit interrupter such as the circuit interrupter 10 described herein. The method of FIG. 11 utilizes the hybrid switching assembly 100 to minimize the effects of arcing when closing contacts.

The method begins at 1020 where isolation between the line and load side of the circuit interrupter 10 is ended. The isolation may be ended when, for example, the moveable arm 101 comes into contact with the clinch joint 104, creating a leakage current path via the solid state switching circuit 110 between the line and load sides of the circuit interrupter 10. The method continues at 1022 where the solid state switching circuit 1022 is powered. The solid state switching circuit 1022 may receive power from a line side voltage.

At 1024, the solid state switching circuit 110 is triggered, for example by the moveable arm 101 actuating the trigger switch 112. At 1026, the separable contacts 1026 are closed. At 1028, the current is commutated past the solid state switching circuit 110. The solid state switching circuit 110 then turns off at 1030 and current flows through the separable contacts 102. Using the hybrid switching assembly 100 when closing the separable contacts 102 reduces arcing contact erosion.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A hybrid switch assembly for use in a circuit interrupter, the hybrid switch assembly comprising:
   an input;
   an output;
   separable contacts electrically connected between the input and the output;
   a solid state switching circuit electrically connected between the input and the output and in parallel with the separable contacts;
   a fuse electrically connected in series with the solid state switching circuit;
   a moveable arm structured to move to separate the separable contacts, and
   a trigger switch disposed in a path of the moveable arm and structured to be actuated when the moveable arm moves to separate the separable contacts,
   wherein the solid state switching circuit is structured to turn on and allow current to flow through it between the input and the output for a predetermined amount of time after the separable contacts separate, and
   wherein the solid state switching circuit includes a trigger circuit structured to cause the solid state switching circuit to turn on, and wherein the trigger circuit is structured to wait a predetermined delay after the trigger switch is actuated before causing the solid state switching circuit to turn on.

2. The hybrid switch assembly of claim 1, further comprising a current limiting inductor electrically connected between the input and the solid state switching circuit.

3. The hybrid switch assembly of claim 1, wherein the trigger circuit includes a number of RC circuits structured to receive an input signal and to provide an output signal the predetermined delay after receiving the input signal.

4. The hybrid switch assembly of claim 1, wherein the trigger circuit includes a monostable multi-vibrator structured to output an output signal for the predetermined amount of time in response to receiving an input signal.

5. The hybrid switch assembly of claim 1, further comprising:
   a clinch joint electrically connected to the solid state switching circuit and being disposed in a path of the moveable arm,
   wherein during a first stage of movement of the moveable arm, the moveable arm is in contact with the clinch joint and an electrical path is formed between the solid state switching circuit and the output via the clinch joint and the moveable arm, and
   wherein during a second stage of movement of the moveable arm, the moveable arm separates from the clinch joint and the electrical path between the solid state switching circuit and the output is broken.

6. The hybrid switch assembly of claim 1, wherein the solid state switching elements are insulated-gate bipolar transistors.

7. The hybrid switch assembly of claim 1, wherein the solid state switching circuit includes a power supply circuit structured to receive power from an arc created by separating the separable contacts and to convert the power received from the arc into one or more DC voltages for use by the solid state switching circuit.

8. The hybrid switch assembly of claim 7, wherein the power supply circuit includes at least one capacitive divider and at least one resistive divider.

9. A hybrid switch assembly for use in a circuit interrupted, the hybrid switch assembly comprising:
an input,
an output;
separable contacts electrically connected between the input and the output;
a solid state switching circuit electrically connected between the input and the output and in parallel with the separable contacts, and
a fuse electrically connected in series with the solid state switching circuit,
wherein the solid state switching circuit is structured to turn on and allow current to flow through it between the input and the output for a predetermined amount of time after the separable contacts separate,
wherein the solid state switching circuit includes n main circuit including a number of solid state switching elements, wherein turning on the solid state switching elements causes the solid state switching circuit to turn on and allow current to flow through it between the input and the output and turning off the solid state switching elements causes the solid state switching circuit to turn off and prevent current from flowing through it between the input and the output,
wherein the main circuit includes a metal oxide varistor (MOV) circuit having a number of MOVs electrically connected between an input and an output of the solid state switching circuit, and
wherein the main circuit includes a bridge circuit electrically connected to the MOV circuit and including a number of diodes arranged as a bridge rectifier.

10. The hybrid switch assembly of claim 9, wherein the main circuit includes a snubber circuit electrically connected between the bridge circuit and the solid state switching elements.

11. A circuit interrupter comprising:
a line side structured to electrically connect to a power source;
a load side structured to electrically connect to a load;
a hybrid switch assembly electrically connected between the line side and the load side, the hybrid switch assembly including:
an input electrically coupled to the line side;
an output electrically coupled to the load side;
separable contacts electrically connected between the input and the output;
a solid state switching circuit electrically connected between the input and the output and in parallel with the separable contacts;
a fuse electrically connected in series with the solid state switching circuit;
a moveable arm structured to move to separate the separable contacts; and
a trigger switch disposed in a path of the movable arm and structured to be actuated when the moveable arm moves to separate the separable contacts,
wherein the solid state switching circuit is structured to turn on and allow current to flow through it between the input and the output for a predetermined amount of time after the separable contacts separate, and
wherein the solid state switching circuit includes a trigger circuit structured to cause the solid state switching circuit to turn on, and wherein the trigger circuit is structured to wait a predetermined delay after the trigger switch is actuated before causing the solid state switching; circuit to turn on;
an operating mechanism structured to open the separable contacts; and
an electronic trip unit structured to detect a fault in power flowing through the circuit interrupter and cause the operating mechanism to open the separable contacts in response to detecting the fault.

* * * * *